United States Patent [19]

Schmidt et al.

[11] 3,735,657
[45] May 29, 1973

[54] APPARATUS FOR CUTTING STRIPS OF MATERIAL

[76] Inventors: Volker Schmidt, Todds Road, R.R. No. 7, Lexington, Ky. 40502; Erich A. Schmidt, 2415 Liberty Road, Lexington, Ky. 40505

[22] Filed: Mar. 9, 1971

[21] Appl. No.: 122,384

[52] U.S. Cl. ..................83/209, 83/63, 83/222, 83/232, 83/236, 83/371
[51] Int. Cl. ..................................B26d 5/20
[58] Field of Search..................83/222, 232, 64, 83/63, 209, 208, 210, 236, 371, 241, 261

[56] References Cited

UNITED STATES PATENTS

| 3,523,392 | 8/1970 | Carl | 83/208 X |
|---|---|---|---|
| 3,283,631 | 11/1966 | Strom | 83/222 X |
| 3,673,906 | 7/1971 | Simpkins | 83/232 |
| 3,177,749 | 4/1965 | Best et al. | 83/208 |
| 1,647,305 | 11/1927 | Peters | 83/232 X |

*Primary Examiner*—Andrew R. Juhasz
*Assistant Examiner*—W. D. Bray
*Attorney*—Frank C. Leach, Jr.

[57] ABSTRACT

Material is fed between a pair of rollers by a pneumatically driven rack rotating a gear, which is connected to one of the rollers through a one direction clutch. When the rack moves downwardly to rotate the roller, a valve is activated just prior to downward movement of the rack stopping to cause a pneumatically powered knife to cut the fed material. Upon completion of cutting of the material, another valve is activated to return the knife to its inactive position and move the rack upwardly to its start position, which is determined by the position of an adjustable stop that limits the upward movement of the rack. This stop determines the amount of downward movement of the rack so as to select the length of the fed strip of material that is cut. In another embodiment, the non-driven roller is moved away from the driven roller when the thickness of the strip of fed material exceeds a predetermined thickness. When the thickness of the strip ceases to exceed the predetermined thickness after having exceeded the predetermined thickness, the non-driven roller is returned toward the rotated roller to cause activation of a valve to stop the downward movement of the rack and activate the knife irrespective of the position of the rack. This results in the thickened portion, which is not usable, being cut as close to the end of the thickened portion as possible so as to reduce material waste.

15 Claims, 11 Drawing Figures

3,735,657

INVENTORS
VOLKER SCHMIDT
ERICH A. SCHMIDT

BY Frank C. Leach Jr.
ATTORNEY

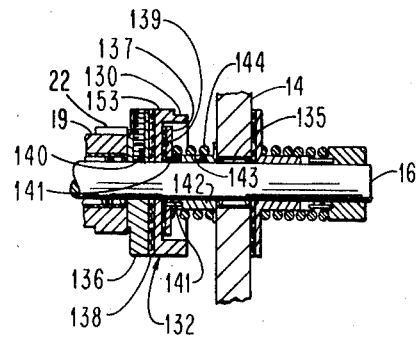
FIG. 8
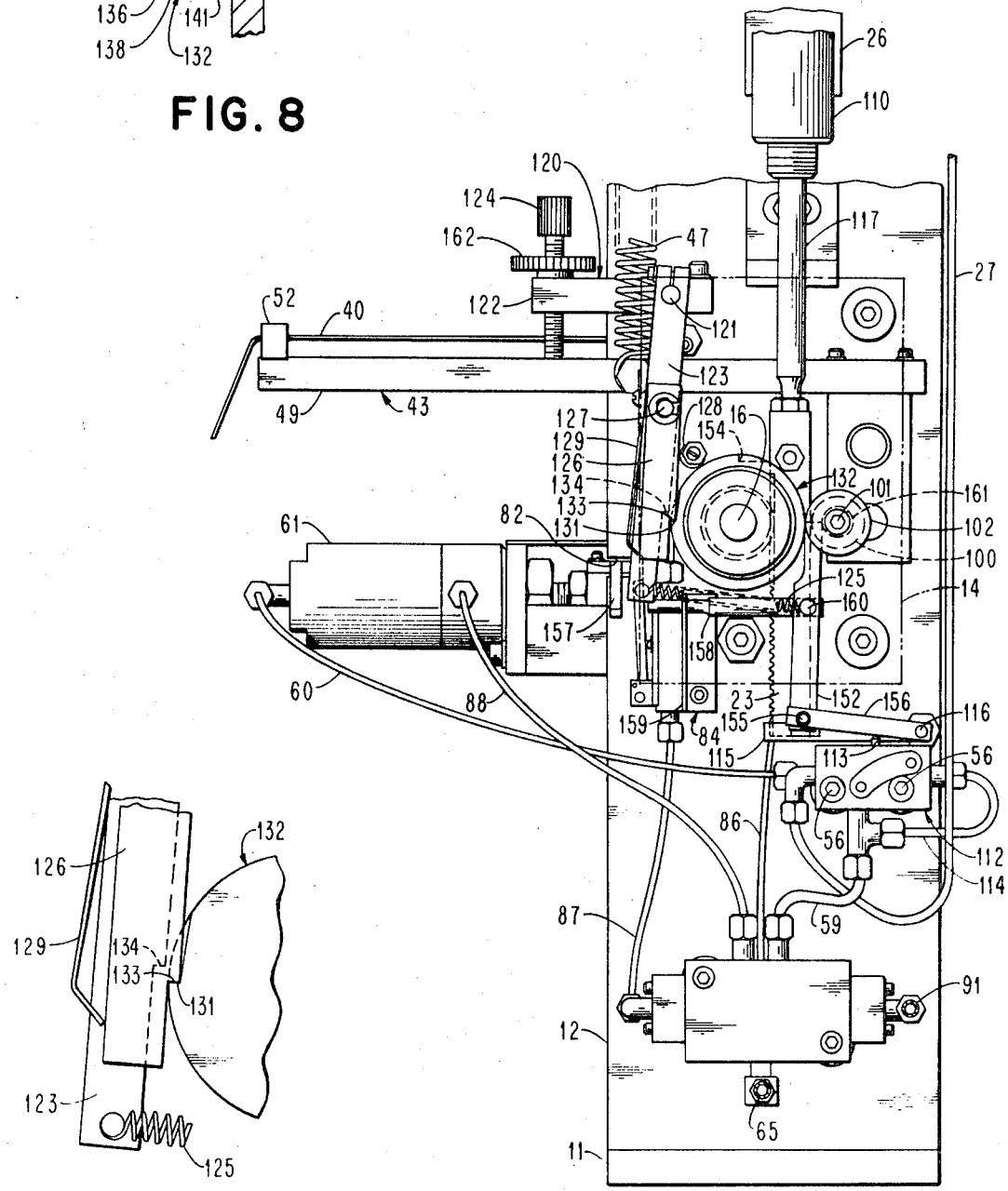
FIG. 10
FIG. 7

APPARATUS FOR CUTTING STRIPS OF MATERIAL

In manufacturing pants, a plurality of lays or pieces of material is stacked for cutting. The pattern for each lay or piece of material includes a strip, which is cut therefrom, with the strip to be later cut into smaller segments for use as belt loops for the pants.

After being cut from lays or pieces of material, the strips of the lays or pieces of material are then sewed to each other in sequence and supplied to a strip cutting machine wherein the strip is cut into segments of the desired length with the segments forming the belt loops. When the sewed strips are supplied to the operator of the strip cutting machine, the continuous strip is identified as being for a particular group of pants. Thus, when the operator of the strip cutting machine cuts the strip into segments of the selected length, the cut segments for a particular pair of pants must be properly identified by the operator of the strip cutting machine. To insure that the cut segments are still identified when they reach a loop tack operator, who sews the cut strips on the pants at spaced intervals to form the belt loops, the operator of the strip cutting machine places the segments for a particular pair of pants in a suitable storage means such as an envelope, for example, that is properly identified for the particular pair of pants.

If the storage means should be misplaced or the operator of the strip cutting machine loses count of the particular pair of pants with which the cut segments are to be employed, then the cut strips or segments will be improperly identified. Thus, when the loop tack operator receives the improperly identified cut strips or segments from the operator of the strip cutting machine, the loop tack operator will sew the cut strips to the wrong pair of pants. This can result in the pair of pants being a second depending on the shading compatibility between the cut strips and the pants.

Instead of sewing the strips in sequence and identifying the various cut segments, another way for causing the cut segments to have compatible shading with the pants has been to have the cutting operator, who stacks the lays or pieces of material before they are cut, inspect the lays or pieces of material to insure that they are the same color and have substantially the same shading. This requires careful inspection by the cutting operator because the color is not the same throughout the entire length of any bolt of material and this color difference, while slight, is even more pronounced between different bolts of material processed to have the same color. Without this precise inspection, the belt loops will not necessarily have compatible shading with the pants.

While having the cutting operator inspect the lays or pieces of material so that they have substantially the same shading and are the same color eliminates the possibility of the operator of the strip cutting machine improperly identifying the particular cut segments, this is not as satisfactory as having the operator of the strip cutting machine identify the cut segments for a particular pair of pants. While it would be desirable for the loop tack operator to inspect the cut portions of the strip of material to insure that the shading between the belt loops and the pair of pants is substantially indistinguishable, the loop tack operator does not make this inspection because the loop tack operator is paid by piece work. Thus, the possibility of the pair of pants becoming a second is increased when the cut segments are not identified for a particular pair of pants.

Furthermore, the present trend to bright colors has accentuated the color difference throughout a particular bolt so as to increase the time required for the cutting operator, who stacks the lays or pieces of material before they are cut, to inspect the lays to obtain compatible shading therebetween whereby there is shade matching between the belt loops and the pants. Thus, this method in which there is no identification of cut segments by the operator of the strip cutting machine is particularly ineffective with bright colors.

Furthermore, the inspection by the operator, who cuts the lays or pieces of material from a pattern to form the pants, is time consuming. This adds to the cost of manufacturing the pants.

Likewise, the time required for the operator of the strip cutting machine to identify the cut segments for a particular pair of pants also is time consuming. This adds to the cost of manufacturing the pants.

The present invention overcomes the foregoing problems of the prior methods for forming belt loops with compatible shading with the pants. The present invention eliminates the requirement for the operator, who cuts the lays or pieces of material, to ascertain whether the various lays or pieces of material are of the same shading or even the same color as has been required in one of the prior methods. The present invention also eliminates the need for there to be a separate operator of the strip cutting machine and the operator of the strip cutting machine to identify the particular cut segments for a particular pair of pants. The present invention insures that the cut segments are from the same lay or piece of material as that from which the pair of pants have been formed without any of the various requirements of the prior methods.

The present invention accomplishes this by providing a strip material cutting machine for use by the loop tack operator at the location at which sewing of the cut strips to the pants to form the belt loops occurs. It is only necessary that the strip of material from each of the lays or pieces of material be sewed to each other in the same order in which the pants, which are formed from the lays or pieces of material that have been cut, are transported to the loop tack operator receiving the sewed strip of material.

Thus, since the strip of material supplied to the loop tack operator has the various strips from the lays or pieces sewed to each other in a desired sequence, each of the strips will correspond to a particular pair of pants if the strips have been sewed together in the same order in which the pants are supplied to the loop tack operator. Accordingly, the loop tack operator need only cut the strip for the particular pair of pants.

Furthermore, the present invention enables the operator to be able to select the length of each of the short strips or segments into which the strip of material is to be cut. Thus, the belt loops may be of any desired length between two and five inches, for example.

Because the thickened portions of the strip of material at which the strips from the lays or pieces of material are sewed to each other cannot be employed as a belt loop, this material becomes scrap. Thus, there are normally two cut portions of the strip that must be scrapped at each thickened portion of the strip of material. Depending on the length of the portions of the strip being cut, this can be a significant waste of material.

In one embodiment of the apparatus of the present invention, the waste of material is substantially reduced by automatically cutting the strip of material just after the thickened portion ceases. Thus, it is not necessary for the portion of the strip having the end of the thickened portion to be of the same length as the strips being cut.

Accordingly, the length of each strip of material cut from each lay or piece of material forming a pair of pants can be reduced. That is, the exact length for each of the belt loops can be determined and the only extra length required is that at each end of the strip that is to be sewed to the adjacent strips. Therefore, there can be a significant saving in material (both goods and thread), sewing time, and cutting time.

The apparatus of the present invention insures that each portion of the strip of material is cut to the selected length through preventing any overtravel or backlash of the feed rollers. This insures that the apparatus of the present invention meters the same length of the strip of material for cutting. Of course, in the embodiment having automatic cutting, when the strip of material has a thickness exceeding a predetermined thickness, this particular cut segment is less than the selected length.

Instead of overlapping the strips from the lays or pieces of material and sewing them together to form the continuous strip of material, the strips from the lays or pieces of material could be spaced from each other a slight distance and have only threads connecting the adjacent ends of two strips to each other to form the continuous strip. Thus, when the continuous strip is formed in this manner, the space between the ends of the two adjacent strips is very thin because it comprises only threads.

It would be necessary to scrap two cut portions of the continuous strip because each portion would contain part of the threads. The present invention eliminates this waste of material since the embodiment of the apparatus of the present invention in which automatic cutting of the continuous strip of material occurs just after the thickened portion ceases also may be employed to cause cutting just after the threads cease when cutting the continuous strip in which the adjacent strips are sewed to each other by threads.

In prior machines in which a strip of material is cut to form segments of desired length, the material has normally been fed in a horizontal direction with the cutting blade being advanced in a vertical direction to cut the material. However, this has had the disadvantage of the material hanging up during feed, particularly where the end of a strip occurs.

The present invention eliminates this problem since it feeds the material vertically and uses a horizontally movable knife. Thus, in the present invention, there is no problem of any hang-up of the material. When the end of the strip is reached, it can fall from between the drive rollers of the present invention by gravity.

In U.S. Pat. No. 3,029,775 to Nicholson, there is shown an apparatus for cutting a strip of material into segments of selected length. However, the aforesaid Nicholson patent has the problem of continually feeding the strip of material so that it tends to bunch up between cuts whereby a specific mechanism must be employed to take care of this bunching up of the strip between cuts.

Furthermore, with the type of continuous feeding of the strip in the aforesaid Nicholson patent, the same precise length of the strip is not cut each time. That is, due to the various movable mechanisms required, there is always a slight difference in the length of the segments cut from the strip of the aforesaid Nicholson patent because of the continued feeding of the strip of material until there is cutting; this cutting can occur slightly earlier or later during each cycle because it depends upon a solenoid.

The present invention overcomes the disadvantages of the aforesaid Nicholson patent since there is no feed when the strip is being cut and there is no cutting when the strip is being fed. This insures that there is no bunching up of the material and that the same precise length of the strip is cut during each cutting operation.

The present invention also enables the loop tack operator to cut the strip only when desired. In the aforesaid Nicholson patent, there is continuous feeding so that there must be continuous cutting of the strip of material.

An object of this invention is to provide an apparatus for cutting strips of material of the same length.

Another object of this invention is to provide an apparatus for automatically cutting thickened portions of a strip of material at substantially the end of the thickened portion irrespective of the length to which each strip is to be cut.

A further object of this invention is to provide an apparatus for cutting strips of material in which the operator may control the apparatus so that only one segment of the strip is cut at any selected time.

Other objects of this invention will be readily perceived from the following description, claims, and drawings.

This invention relates to an apparatus for cutting strips of material. The apparatus has means to feed the material and means to inactivate the feed means to stop feeding of the material in response to a selected length of the material being fed by the feed means past a cutting position. The apparatus includes means to cut the fed material at the cutting position and means responsive to the feed means to activate the cutting means to cut the fed material substantially simultaneously with stopping of the feed means. The apparatus also has means responsive to the cutting means completing cutting of the fed material to cause simultaneous return of the cutting means to its inactive position and the feed means to a position in which feeding of the material by the feed means may again occur.

The attached drawings illustrate preferred embodiments of the invention, in which:

FIG. 7 is a rear elevational view of the apparatus of FIG. 6 with the support block shown in phantom;

FIG. 8 is a fragmentary sectional view showing the driving arrangement between a drive shaft and a cam of the apparatus of FIG. 6 and taken along line 8—8 of FIG. 6;

FIG. 10 is a fragmentary elevational view showing the cooperation of a finger and an arm with the cam.

Figure 1:
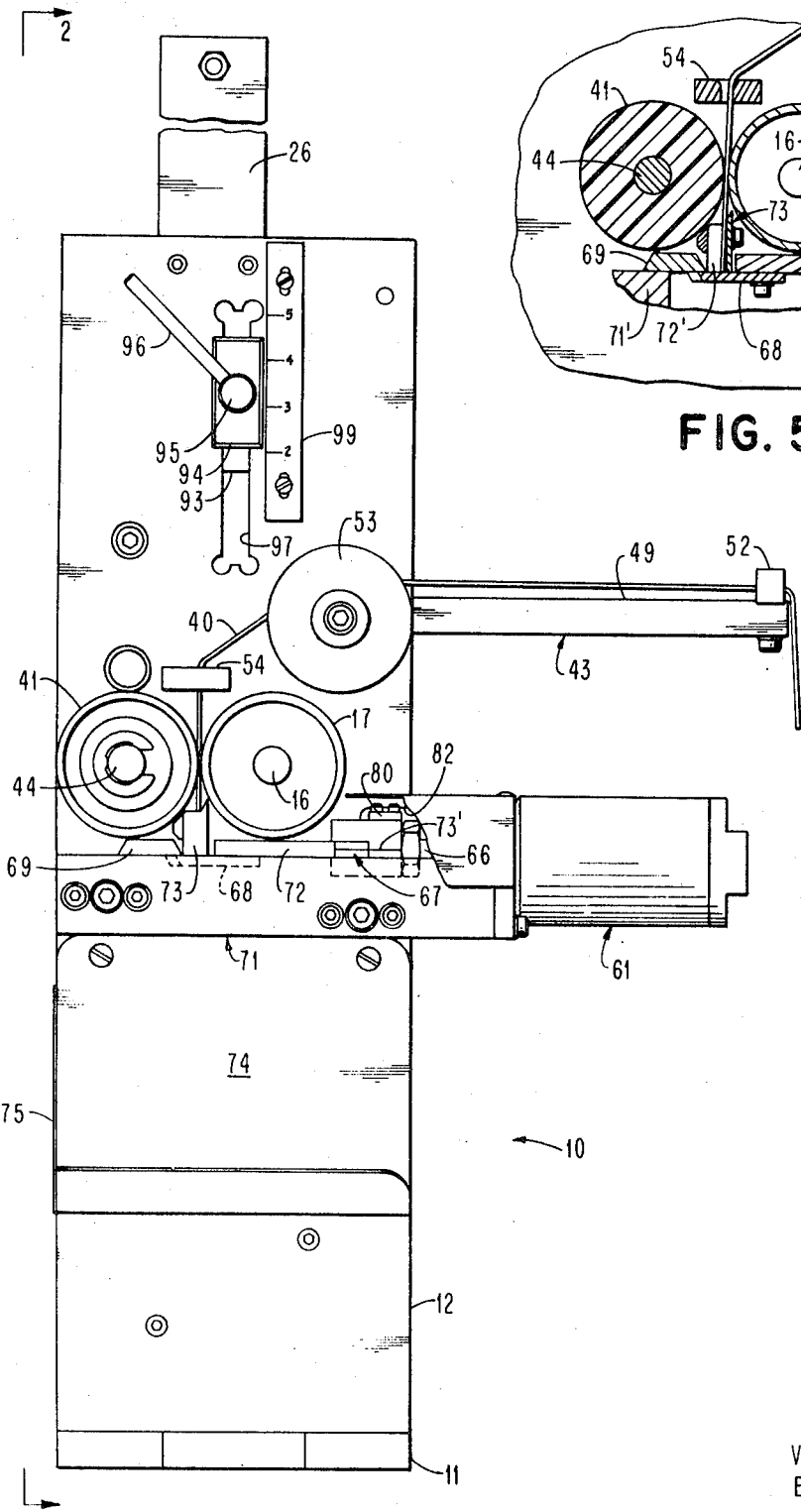
FIG. 1 is a front elevational view of the strip cutting apparatus of the present invention with the cutting blade in its cutting position.
Figure 2:
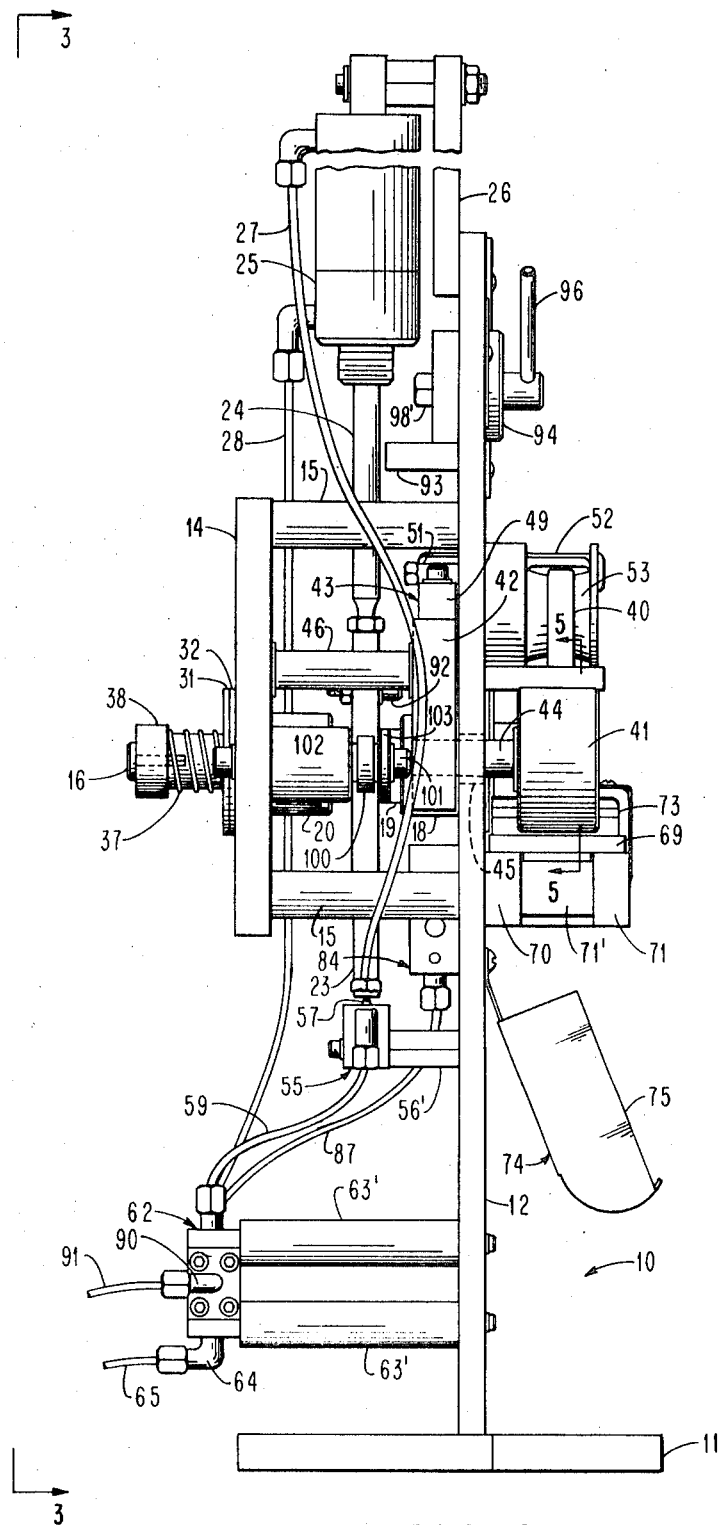
FIG. 2 is a side elevational view of the apparatus of FIG. 1 and taken along line 2—2 of FIG. 1.
Figure 3:
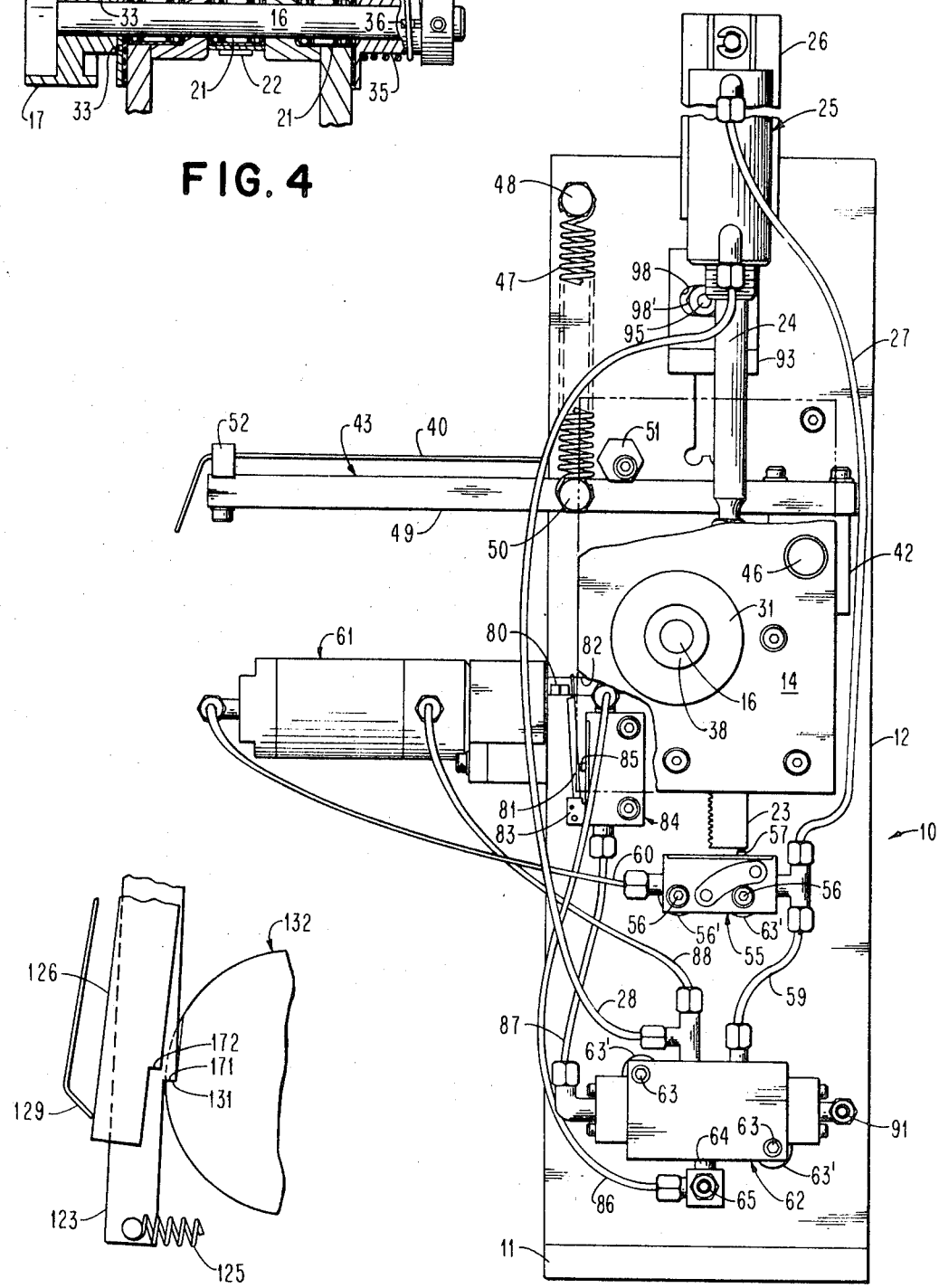
FIG. 3 is a rear elevational view of the apparatus of FIG. 1 with the cutting blade in its inactive position and taken along line 3—3 of FIG. 2.
Figures 6, 9:
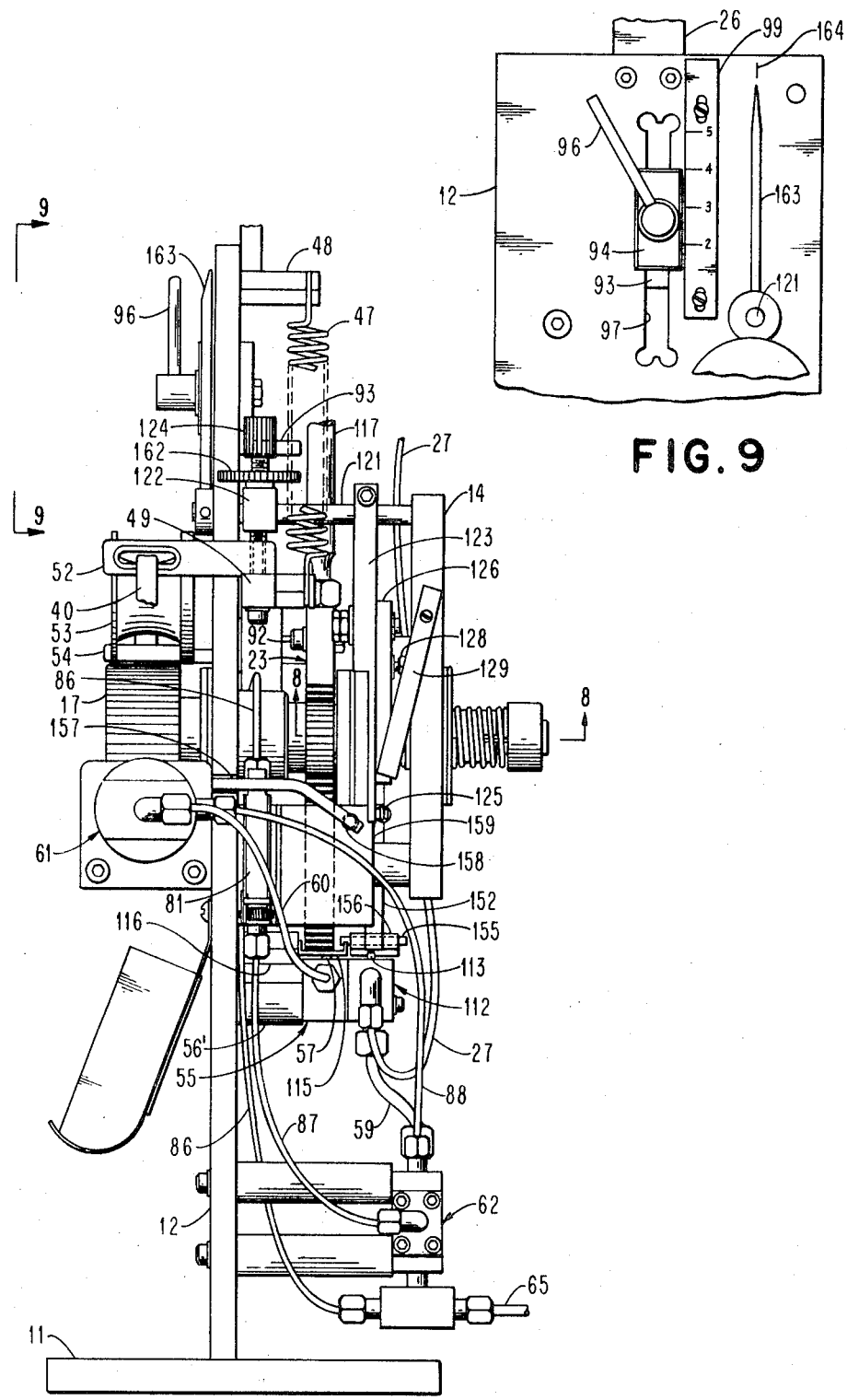
FIG. 6 is a side elevational view of another form of the apparatus of the present invention and taken from the opposite side of the apparatus to that of FIG. 2.
FIG. 9 is a front elevational view of a portion of the apparatus of FIG. 6 and taken along line 9—9 of FIG. 6.

Referring to the drawings and particularly FIGS. 1 to 3, there is shown an apparatus 10 for cutting strips or portions of a selected length from a strip of material, which comprises a plurality of strips sewed to each other. The apparatus 10 includes a base 11 having an upstanding support or frame 12 secured thereto. The support or frame 12 has a support block 14 (see FIGS. 2 and 3) disposed in spaced parallel relation thereto by spacers 15.

Figure 4:
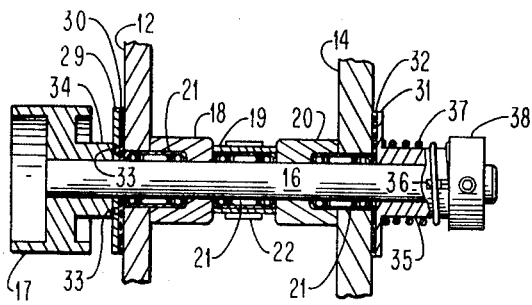
FIG. 4 is a sectional view showing the support arrangement for the driven roller of the feed mechanism of the apparatus of FIG. 1.

As shown in FIG. 4, a shaft 16 is rotatably supported by the support or frame 12 and the support block 14. The shaft 16 extends beyond each side of the support or frame 12 and the support block 14. A knurled roller 17, which is preferably formed of metal, is fixed to the shaft 16 for rotation therewith. Thus, whenever the shaft 16 is rotated, the knurled roller 17 is rotated.

The shaft 16 extends through a bearing housing 18, a gear housing 19, and a bearing housing 20, which are disposed between the support or frame 12 and the support block 14. Each of the bearing housings 18 and 20 has a one direction clutch 21 therein. The one direction clutches 21 also rotatably support the shaft 16 in the support or frame 12 and the support block 14. The gear housing 19 also has one of the one direction clutches 21 therein. One suitable example of the one direction clutches 21 is sold by Torrington Manufacturing Company, Torrington, Connecticut as model RCB-081214.

The one direction clutches 21 allow the shaft 16 to be rotated in only one direction when a gear 22 on the gear housing 19 is rotated. Thus, even though the gear 22 can be rotated in either direction, the shaft 16 is rotated only when the gear 22 rotates in one direction and not when the gear 22 rotates in the other direction.

The gear 22 is driven by a vertically disposed rack 23 (see FIG. 2). The rack 23 has its upper end connected to a piston rod 24 of an air cylinder 25, which has its upper end supported by a post 26 on the upper end of the support or frame 12. Accordingly, when pressurized air is supplied to the upper end of the air cylinder 25 through a hose 27 to act on the upper surface of the piston of the piston rod 24, the rack 23 is moved downwardly whereby the knurled roller 17 is rotated counterclockwise (as viewed in FIG. 1) since the one direction clutches 21 allow rotation of the knurled roller 17 in this direction. One suitable example of the air cylinder 25 is sold by Bimba Manufacturing Company, Monee, Illinois as model 123-DP.

The rack 23 is moved upwardly when pressurized air is supplied to the lower end of the cylinder 25 through a hose 28 to act on the lower surface of the piston of the piston rod 24. At this time, the one direction clutches 21 prevent the shaft 16 and the roller 17 from rotating even though the gear 22 is rotated by the rack 23.

When the knurled roller 17 is rotated by the downward movement of the rack 23, there is no overtravel of the knurled roller 17 when the downward movement of the rack 23 is stopped. When the roller 17 rotates, a metallic disc 29 (see FIG. 4), which rotates with the roller 17, rubs against a felt washer 30, which is disposed between the disc 29 and the support or frame 12 and does not rotate with the disc 29 because the support or frame 12 has a rough surface while the disc 29 has a smooth surface, and a metallic disc 31, which rotates with the roller 17, rubs against a felt washer 32, which is disposed between the disc 31 and the support block 14 and does not rotate with the disc 31 because the support block 14 has a rough surface while the disc 31 has a smooth surface. When the roller 17 ceases to be rotated, the disc 29 and the felt washer 30 and the disc 31 and the felt washer 32 cooperate to produce the braking effect to prevent any overtravel of the roller 17.

The disc 29 is rotated with the roller 17 due to two diametrically disposed pins 33 on a reduced portion 34 of the knurled roller 17 being disposed in diametrically disposed cooperating openings in the disc 29. The disc 31 rotates with the shaft 16 and the knurled roller 17 since the disc 31 is formed integral with a cylindrical portion 35, which is fixed to the shaft 16 for rotation therewith. A set screw (not shown) is fixed to the shaft 16 and extends into a longitudinal slot 36 in the cylindrical portion 35.

The disc 31 is urged against the felt washer 32 by a spring 37, which surrounds the cylindrical portion 35. A collar 38 is fixed to the end of the shaft 16 for rotation therewith. Accordingly, because of the longitudinal slot 36, the disc 31 can move longitudinally along the axis of the shaft 16 because of the spring 37 until the washer 32 is urged against the support block 14.

When the knurled roller 17 is rotated, a strip 40 of material, which is supported on a roller separate from the apparatus of the present invention, is fed or advanced between the roller 17 and a roller 41, which is preferably formed of plastic such as nylon, for example. The roller 41 is mounted on an arm 42 (see FIG. 2) of a lever 43 (see FIGS. 1 and 3). The roller 41 is rotatably supported on the arm 42 through being rotatably mounted on a stud 44, which is fixed to the arm 42 and extends from the arm 42 through an enlarged circular opening 45 in the support or frame 12.

The arm 42 is pivotally supported between the support or frame 12 and the support block 14 by a pin 46 (see FIG. 2) to pivotally mount the lever 43. The lever 43 is continuously urged about the axis of the pin 46 to a position in which the roller 41 is adjacent the knurled roller 17 for cooperation therewith to permit the strip 40 of material to be fed therebetween when the knurled roller 17 is rotated. However, there is a very minute space between the rollers 17 and 41 to prevent any engagement therebetween if there is no material between the rollers 17 and 41. This prevents any damage to the roller 41 by the knurled roller 17.

The lever 43 is continuously biased by a spring 47 (see FIG. 3) to the position in which the rollers 17 and 41 can cooperate so that the roller 17 can feed the material 40 therebetween. One end of the spring 47 is secured to the support or frame 12 by a screw 48 and its other end is secured to an arm 49, which is fixed to the arm 42, of the lever 43 by a screw 50.

A stop 51, which is supported on the support or frame 12, cooperates with the upper surface of the arm 49 of the lever 43 to limit the movement of the lever 43 by the spring 47. Thus, the stop 51 insures that the lever 43 cannot be moved by the spring 47 to a position in which the roller 41 would engage the roller 17.

The strip 40 of material is fed through an opening in a lead-in guide 52 on the end of the arm 49 of the lever 43 and then over a guide roll 53 (see FIG. 1), which is secured to the support or frame 12 with respect to the opening in the lead-in guide 52 so that the portion of the strip 40 of material between the guide 52 and the guide roll 53 is substantially horizontal when the arm 49 is in the position of FIGS. 1 and 3.

A feed-in guide 54 is supported on the support or frame 12 and has an opening therein vertically aligned with the space between the rollers 17 and 41. Thus, the strip 40 of material is vertical when it passes between the rollers 17 and 41.

As previously mentioned, the downward movement of the rack 23 causes rotation of the knurled roller 17 whereby the strip 40 is fed by the roller 17 cooperating with the roller 41 at this time. The downward movement of the rack 23 ceases when the piston on the piston rod 24 engages a portion of the air cylinder 25.

The downward movement of the rack 23 ceases prior to the rack 23 engaging a valve housing 55 (see FIG. 3), which is supported on the support or frame 12 by two screws 56 extending through two spacers 56' so that the valve housing 55 is disposed in spaced relation to the support or frame 12, but not before a resiliently biased button 57 of the valve housing 55 is engaged by the lower end of the rack 23. When the button 57 is moved inwardly by the end of the rack 23 against the force of a spring in the valve housing 55, a valve (not shown), which is connected to the button 57, in the valve housing 55 is moved to a position in which an inlet having a hose 59 connected thereto and an outlet having a hose 60 connected thereto communicate with each other so that the hoses 59 and 60 communicate with each other. When the button 57 is not engaged by the end of the rack 23 so that the button 57 is urged outwardly of the valve housing 55 by the spring, the valve in the valve housing 55 is moved so that an inlet in the bottom of the valve housing 55 communicates with the outlet to which the hose 60 is connected whereby the hose 60 is vented to the atmosphere through the inlet in the bottom of the valve housing 55. One suitable example of the valve construction forming the valve housing 55 is a three way miniature control valve sold by The Aro Corporation, Bryan, Ohio as model 209.

The hose 60 leads from the valve housing 55 to one end of a horizontally disposed air cylinder 61, which is supported by the support or frame 12. One suitable example of the air cylinder 61 is sold by Bimba Manufacturing Company, Monee, Illinois as model 170.5–D.

The hose 59 also is connected with a valve housing 62, which is supported on the support or frame 12 by two screws 63 extending through two spacers 63' so that the valve housing 62 is disposed in spaced relation to the support or frame 12. One suitable example of the valve construction forming the valve housing 62 is a double pilot operated four way valve sold by The Aro Corporation, Bryan, Ohio as model 5040–35. The valve housing 62 has a valve spool therein movable in one direction when pressurized air is applied against one end and movable in the opposite direction when pressurized air is applied against the other end. The valve spool remains in the position to which it is moved until pressurized air is applied to the opposite end.

Pressurized air is supplied to the valve housing 62 through an inlet port 64 to which a hose 65 is connected. The hose 65 leads to the source of pressurized air such as a compressor, for example.

Figure 5:
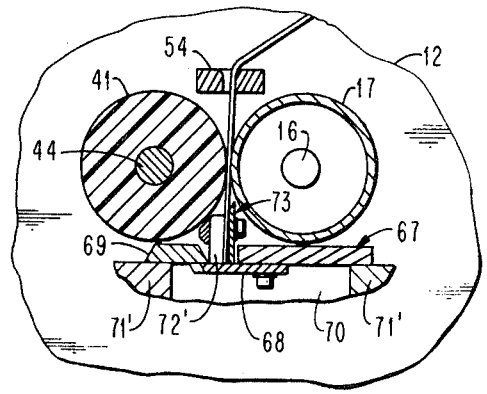
FIG. 5 is a fragmentary sectional view, partly in elevation, of a portion of the apparatus of FIG. 2 and taken along line 5—5 of FIG. 2.

The air cylinder 61 has its piston rod 66 (see FIG. 1) connected through connecting means 67 to a knife or cutting blade 68 as shown in FIG. 5. Thus, when pressurized air is supplied through the hose 60 to the air cylinder 61, the knife 68 is moved relative to a stationary knife or cutting blade 69, which is supported by the support or frame 12 through interconnected support blocks 70 and 71 (see FIG. 2) held in spaced relation by blocks 71'.

Each of the support blocks 70 and 71 has a guide 72 (one shown in FIG. 1 on the support block 71) supported thereon to guide the connecting means 67 for horizontal movement so that the cutting blade 68 is maintained in the desired relationship with respect to the stationary knife or cutting blade 69. Each of the guides 72 has a flange overlying an adjacent horizontal surface (one shown at 73' in FIG. 1) of the connecting means 67.

The knife or cutting blade 68 cuts the strip 40 of material after it has passed through an opening 72' (see FIG. 5) in a guide 73 (see FIGS. 2 and 5), which is supported by the blocks 70 and 71; the strip 40 of material passes through the opening 72' in the guide 73 after being fed by the rollers 17 and 41. Thus, as the strip 40 of material passes through the opening 72' in the guide 73, it is cut by the knife or cutting blade 68 moving beneath the bottom of the guide 73 and into cooperating engagement with the knife or cutting blade 69 as shown in FIGS. 1 and 5 wherein the knife or cutting blade 68 is shown in its cutting position.

After the selected length of the strip 40 of material has been cut by the movement of the cutting blade 68, the cut strip falls into a tray 74, which is secured to the support or frame 12. The bottom of the tray 74 is curved, and one side of the tray 74 has a wall 75 secured thereto. Thus, the cut strips are easily collected in the tray 74.

When the knife or cutting blade 68 is moved to the position of FIG. 1 in which cutting of the strip 40 of material occurs, a finger 80 (see FIGS. 1 and 3) on the connecting means 67 engages a resiliently biased arm 81 (see FIG. 3) by extending through a horizontal slot 82 in the support or frame 12. The arm 81, which is pivotally mounted on a bracket 83 carried by a valve housing 84 fixed to the support or frame 12, is moved into engagement with a resiliently biased button 85 of the valve housing 84. One suitable example of the valve construction forming the valve housing 84 is a three way miniature control valve sold by The Aro Corporation, Bryan, Ohio as model 200.

When the button 85 is activated by the arm 81, pressurized air now also flows from the hose 65 through a hose 86 to the upper end of the valve housing 84, through the valve housing 84 due to the change in position of a valve therein by the activation of the button 85, and through a hose 87 to the valve housing 62. The supply of the pressurized air through the hose 87 changes the position of the valve spool in the valve housing 62 whereby pressurized air flows from the port 64 through the valve housing 62 to the hose 28 and a hose 88. The change in the position of the valve spool in the valve housing 62 disconnects the hose 59 from the port 64 and connects the hose 59 to the atmosphere whereby both the hoses 27 and 60 communicate with the atmosphere.

The hose 88 leads to the opposite side of the air cylinder 61 from that to which the hose 60 is connected. Thus, pressurized air is supplied to the cylinder 61 to cause it to retract the cutting blade 68.

At the same time that the pressurized air is supplied to the hose 88, it also is supplied to the hose 28, which is connected to the lower end of the air cylinder 25. Accordingly, this pressurized air moves the rack 23 upwardly. The pressurized air in the upper end of the air cylinder 25 is vented to the atmosphere through the hoses 27 and 59.

Because the hose 59 is vented to the atmosphere due to the position of the valve spool in the valve housing 62, the rack 23 may be easily moved upwardly by the supply of pressurized air through the hose 28. As soon as the rack 23 moves away from the button 57, the valve in the valve housing 55 blocks communication between the hoses 59 and 60 whereby the hose 60 is no longer connected to the atmosphere through the hose 59. However, the valve in the valve housing 55 vents the hose 60 to the atmosphere when the valve blocks communication between the hoses 59 and 60. Accordingly, the cutting blade 68 may be easily returned to its inactive position due to retraction of the piston rod 66 into the air cylinder 61 since the hose 60 is always vented to the atmosphere during this retraction.

It should be understood that the valve spool in the valve housing 62 was initially positioned to cause pressurized air to be supplied from the port 64 to the hose 59 due to supply of a pulse of pressurized air to a port 90 (see FIG. 2) by a hose 91, which leads to the same pressurized source as the hose 65. The operator activated a switch to start the operation whereby the pulse of pressurized air was supplied to the port 90.

The upward movement of the rack 23 by the air cylinder 25 is limited by the engagement of a stop 92 (see FIG. 2) on the rack 23 with an L-shaped block 93, which is adjustably supported on the support or frame 12. The L-shaped block 93 has a slide 94 (see FIG. 1) connected thereto by a threaded bolt 95, which has a handle 96 integral with one end thereof.

The threaded bolt 95 slidably extends through an opening (not shown) in the slide 94, an elongated vertical slot 97 in the support or frame 12, and an enlarged opening 98 (see FIG. 3) in the L-shaped block 93. A nut 98' (see FIGS. 2 and 3) is threaded to the end of the threaded bolt 95 to retain the L-shaped block 93 in any position to which the L-shaped block 93 is moved.

The position of the L-shaped block 93 is adjusted by turning the handle 96 to release the slide 94 from tight engagement with one side of the support or frame 12 and the L-shaped block 93 from tight engagement with the other side of the support or frame 12. The block 93 and the slide 94 are then moved vertically until the L-shaped block 93 is at the desired position. Then, turning of the handle 96 in the opposite direction will move the slide 94 against the one side of the support or frame 12 and the L-shaped block 93 against the other side of the support or frame 12 because of the cooperation of the nut 98' with the bolt 95 so that the L-shaped block 93 is held in the desired position. The nut 98' is partially disposed within the opening 98 so that the nut 98' cannot turn when turning of the handle 96 rotates the bolt 95.

Accordingly, by adjusting the position of the L-shaped block 93, the amount of upward movement of the rack 23 is controlled. Thus, the distance that the rack 23 can travel downwardly is controlled whereby the amount of rotation of the roller 17 is regulated since this is determined by the amount of downward movement of the rack 23.

Therefore, the length of the strip 40 of material that is fed by the roller 17 before cutting by the movement of the knife or cutting blade 68 is selectively controlled. Thus, the operator can select the length of each of the strips or segments that is cut from the strip 40 of material through positioning the L-shaped block 93.

To aid the operator in determining the length of the strip being cut by the position of the L-shaped block 93, an index scale 99 is secured to the support or frame 12. The index scale 99 has indicia thereon indicating various inches of length of the strip 40 of material to be cut between two and five inches. The upper surface of the slide 94 serves as a pointer for cooperation with the indicia on the scale 99.

The rack 23 has a guide roller 100 (see FIG. 2) cooperating with a surface of the rack 23 opposite to the surface having the teeth of the rack 23. The roller 100 is rotatably mounted on a stud 101, which is secured to the support block 14.

A cylindrical shaped member 102 is fixed to the stud 101 between the support block 14 and the guide roller 100 so that the end surface of the cylindrical shaped member 102 bears against one side of the rack 23. A washer 103 is fixed to the stud 101 on the opposite side of the guide roller 100 from the cylindrical shaped member 102 so that the washer 103 has one of its end surfaces bearing against the other side of the rack 23. Accordingly, the roller 100, the member 102, and the washer 103 cooperate to form a guide for the rack 23 to insure that the rack 23 moves vertically.

Considering the operation of the apparatus of FIGS. 1 to 5, the slide 94 is positioned to insure that each of the cut strips of the strip 40 of material is cut to a selected length. It should be understood that the slide 94 normally remains at the same position for many of the strips 40 of material.

To begin the operation, the strip 40 of material must be fed through the opening in the lead-in guide 52, over the guide roll 53, and then through the opening in the feed-in guide 54. The arm 49 of the lever 43 is moved downwardly against the force of the spring 47 by pivoting of the lever 43 counterclockwise (as viewed in FIG. 3) about the axis of the pin 46 to allow the roller 41 to move away from the knurled roller 17 so that the strip 40 of material may be passed therebetween after passing through the opening in the feed-in guide 54.

If the operator wants to insure that the first cut strip is of at least the desired length, it is necessary to feed the strip 40 of the material down through the opening 72' (see FIG. 5) in the guide 73 until the end of the strip 40 of material has at least passed the knife or cutting blade 69. Then, the operator actuates a switch (not shown) to cause the supply of a pulse of pressurized air through the hose 91 and the port 90 (see FIG. 2) to the valve housing 62. As a result, the valve spool in the valve housing 62 is disposed so that pressurized air flows from the inlet port 64 through the valve housing 62 to the hose 59.

At this time, the valve in the valve housing 55 is arranged so that pressurized air cannot flow from the hose 59 through the valve housing 55 to the hose 60; thus, the pressurized air from the hose 59 flows only to the hose 27. At this time, the hose 28 is connected to the atmosphere due to the position of the valve spool in the valve housing 62. Accordingly, when pressurized air is supplied through the hose 27 to the upper end of the air cylinder 25, the rack 23 is moved downwardly to rotate the knurled roller 17.

The downward movement of the rack 23 ceases when the piston on the piston rod 24 abuts against a fixed portion of the air cylinder 25 in which it moves. Just prior to the rack 23 ceasing downward movement, the resiliently biased button 57 of the valve housing 55 is moved inwardly by the bottom of the rack 23 engaging therewith. When this occurs, pressurized air flows from the hose 59 to the hose 60 to cause the cutting blade 68 to be advanced to cut the material, which has been fed by the knurled roller 17, after feeding of the strip 40 of material has stopped.

When the cutting blade 68 is advanced to cut a portion of the strip 40 of material by cooperating with the stationary cutting blade 69 as shown in FIGS. 1 and 5, the finger 80 on the connecting means 67 engages the arm 81 to move the resiliently biased button 85 of the valve housing 84 into the valve housing 84. This changes the position of the valve in the valve housing 84 to allow pressurized air to be supplied through the hose 86, the valve housing 84, and the hose 87 to the valve housing 62 to shift the position of the valve spool in the valve housing 62. As a result, pressurized air flows from the port 64 to the hoses 28 and 88, and the hose 59 is vented to the atmosphere.

The supply of pressurized air through the hose 28 causes the piston rod 24 to move upwardly. Because the hose 59 has been connected to the atmosphere, the upper portion of the air cylinder 25 is vented through the hoses 27 and 59.

The supply of pressurized air through the hose 88 returns the cutting blade 68 to its inactive position. The hose 60 is connected to the hose 59, which is now connected to the atmosphere through the valve housing 62, until the rack 23 moves upwardly away from the button 57. Then, the valve in the valve housing 55 blocks the communication between the hoses 59 and 60, but the valve in the valve housing 55 now is positioned so that the hose 60 is connected to the atmosphere through the inlet in the bottom of the valve housing 55. Thus, the cutting blade 68 may be easily returned to its inactive position since the hose 60 is always connected to the atmosphere when pressurized air is supplied through the hose 88.

The upward movement of the rack 23 is stopped by engagement of the stop 92 on the rack 23 with the L-shaped block 93 on the support or frame 12. When the finger 80 is retracted with the piston rod 66 of the air cylinder 61, the button 85 is again urged outwardly from the valve housing 84. This again moves the valve in the valve housing 84 to block communication between the hoses 86 and 87.

When the valve in the valve housing 84 blocks flow of pressurized air from the hose 86 to the hose 87, the hose 87 is vented to the atmosphere through the valve in the valve housing 84. However, the valve spool in the valve housing 62 does not change its position until another pulse of pressurized air is supplied to the port 90 (see FIG. 2) of the valve housing 62 by the operator actuating the switch to start another cycle.

Therefore, each advance of the strip 40 of material to cut a selected length of the material is under the control of the operator. Once the operator activates the switch, a complete cycle occurs to cut the selected length. At the completion of the cutting cycle, the apparatus is inactivated until the operator again actuates the switch.

Referring to FIGS. 6 to 10, there is shown another embodiment of the apparatus of the present invention. The same numeral will be employed to identify the same element as in the apparatus of FIGS. 1 to 5.

In this embodiment, the air cylinder 25 is replaced by an air cylinder 110, which has the hose 27 connected to the upper end thereof while a spring (not shown) is disposed within the air cylinder 110 to always return the rack 23 upwardly until the stop 92 on the rack 23 engages the L-shaped block 93. Thus, no pneumatic pressure is required to move the rack 23 upwardly but only venting of the pressurized air from the upper end of the air cylinder 110. One suitable example of the air cylinder 110 is sold by Bimba Manufacturing Company, Monee, Illinois as model 123–P.

The hose 59 is not connected directly to the hose 27 as in the apparatus of FIGS. 1 to 5. Instead, the hose 59 is connected through a valve housing 112, which is supported on the screws 56 and adjacent the valve housing 55, to the hose 27. The valve housing 112 is the same as the valve housing 55. The hose 59 is connected to an inlet at the bottom of the valve housing 112 rather than an inlet at the side of the valve housing 112 so that communication between the hoses 59 and 27 occurs when a resiliently biased button 113 of the valve housing 112 is urged outwardly of the valve housing 112 and communication between the hoses 59 and 27 is stopped when the button 113 is moved inwardly. The valve in the valve housing 112 operates in the same manner as the valve in the valve housing 55 but the connection of the hose 59 to the bottom inlet produces flow between the hoses 27 and 59 when the button 113 is not engaged.

The hose 59 also is connected to the valve housing 55 through a hose 114 (see FIG. 7) connected to an inlet on the side of the valve housing 55 as in the apparatus of FIGS. 1–5 so that the hose 59 can still communicate with the hose 60 when the button 57 is moved downwardly by the rack 23. The rack 23 does not make direct contact with the button 57 in this embodiment but engages a finger 115, which is mounted on a pivot or hinge pin 116 for pivotal movement about the axis of the pin 116. The pivot pin 116 is fixed to the support or frame 12. The force of the spring acting on the button 57 is sufficient to prevent the finger 115 by itself from moving the button 57 inwardly.

Accordingly, when the rack 23 is moved downwardly to rotate the gear 22 to cause the shaft 16 to rotate through the one direction clutch 21 to rotate the knurled roller 17 to advance the strip 40 of material, it engages the finger 115 to move the button 57 into the valve housing 55 to allow communication between the hoses 59 and 60 in the same manner as described for the apparatus of FIGS. 1 to 5 whereby cutting of the strip 40 of material, which has been advanced by rotation of the knurled roller 17 due to downward movement of the rack 23, occurs due to the supply of pressurized air through the hose 60 to the air cylinder 61. The downward movement of the rack 23, which is connected to piston rod 117 of the air cylinder 110, is stopped by the piston of the piston rod 117 engaging a spacer, which is supported by the air cylinder 110 within the spring in the air cylinder 110, to prevent any further movement.

In addition to being able to cut the strip 40 of material after the selected length has been advanced by the knurled roller 17 being rotated due to the gear 22 being rotated by the downward movement of the rack 23, this modification also enables automatic cutting of the strip 40 of material after the thickened portion, which results from the sewing together of two strips from two pieces or lays of material, has been advanced by the knurled roller 17 just beyond the position at which the cutting blade 68 cuts the strip 40 of material. Accordingly, this embodiment includes means to sense when the thickened portion initially passes between the rollers 17 and 41 and when the thickened portion of the strip 40 of material ceases to pass between the rollers 17 and 41.

By stopping the rotation of the roller 17 through stopping downward movement of the rack 23, which is connected to the roller 17 through the gear 22, the one direction clutch 21, and the shaft 16 to cause rotation of the roller 17 during downward movement of the rack 23, a predetermined distance after the thickened portion of the strip 40 of material has passed between the rollers 17 and 41, the cutting blade 68 can be activated to precisely cut the strip 40 of material just beyond the end of the thickened portion of the strip 40 of material. Therefore, a minimum waste of the strip 40 of material for the thickened portion occurs when using this embodiment.

As shown in FIG. 7, the mechanism for sensing when the thickened portion of the strip 40 of material enters and leaves between the rollers 17 and 41 includes a lever 120. The lever 120 includes a pivot pin 121, which is rotatably mounted in the support or frame 12 and the support block 14 to permit the lever 120 to pivot, and a pair of arms 122 and 123 fixed to the pivot pin 121.

The arm 122 of the lever 120 has an adjusting screw 124 supported thereon with its bottom end engaging the top surface of the arm 49 of the lever 43. Since the lever 43 is connected to the roller 41, movement of the roller 41 away from the knurled roller 17 due to the thickened portion passing therebetween results in the lever 43 pivoting counterclockwise against the force of the spring 47. When the thickened portion ceases to pass between the rollers 17 and 41, the arm 49 of the lever 43 returns to the position of FIG. 7 due to the force of the spring 47.

When the arm 49 of the lever 43 pivots counterclockwise due to the thickened portion of the strip 40 of material passing between the rollers 17 and 41, the arm 122 of the lever 120 also pivots counterclockwise because the adjusting screw 124 is maintained in contact with the top surface of the arm 49 of the lever 43. This is due to an extension spring 125, which is connected to the arm 123, urging the lever 120 counterclockwise.

The arm 123 of the lever 120 has a finger 126, which terminates short of the end of the arm 123 of the lever 120, pivotally mounted thereon by a pin 127. The finger 126 is urged against a stop 128 on the support block 14 by a spring 129, which is carried by the support block 14.

The finger 126 and the arm 123 of the lever 120 are disposed for cooperation with a cam profile 130 (see FIG. 8), which has a single lobe 131 (see FIGS. 7 and 10), of a cam 132. The finger 126 has a shoulder 133 thereon adapted to engage the lobe 131 on the cooperating cam profile 130 of the cam 132. The arm 123 of the lever 120 has a shoulder 134 thereon for also engaging the lobe 131 on the cooperating cam profile 130 of the cam 132.

The shoulder 133 of the finger 126 is positioned at a lower point from the axis of the pivot pin 127 than the shoulder 134. Accordingly, when the cam 132 rotates clockwise, the lobe 131 is initially engaged by the shoulder 133 of the finger 126. The lobe 131 is engaged by the shoulder 134 of the arm 123 only when the shoulder 133 is removed from engagement with the lobe 131 and the cam 132 rotates clockwise a slight amount.

The cam 132 is mounted on the shaft 16 in place of the bearing housing 20 of FIGS. 1 to 5. As a result of the replacement of the bearing housing 20, it is necessary to utilize a roller bearing 135 (see FIG. 8) to rotatably mount the shaft 16 in the support block 14.

The cam 132 is rotatably mounted on the shaft 16 between a pair of metallic discs 136 and 137. A felt washer 138 is disposed between the disc 136 and the cam 132, and a felt washer 139 is disposed between the cam 132 and the disc 137. The disc 136 is fixed to the shaft 16 for rotation therewith by a set screw 140 so that the disc 136 rotates whenever the shaft 16 rotates.

The disc 137 rotates with the shaft 16 because of two diametrically disposed drive pins 141 being disposed in two diametrically disposed holes in the disc 137 and in corresponding longitudinal slots in a collar 142, which is fixed to the shaft 16 by a set screw 143. A spring 144 is disposed between the collar 142 and the disc 137 in surrounding relation to the collar 142 to urge the disc 137 toward the cam 132.

Accordingly, the cam 132 always seeks to rotate clockwise with the shaft 16. However, the shoulder 133 of the finger 126 normally prevents rotation of the cam 132 with the shaft 16 because of the shoulder 133 engaging the lobe 131 on the cam profile 130 of the cam 132.

However, when the arm 49 of the lever 43 is pivoted counterclockwise due to the thickened portion of the strip 40 of material entering between the rollers 17 and 41, the arm 122 follows the movement of the arm 49 of the lever 43. This causes the arm 123 of the lever 120 to be moved toward the cam 132 so that the shoulder 134 of the arm 123 is moved into engagement with the cooperating cam profile 130 of the cam 132.

This counterclockwise pivoting of the lever 120 about the axis of the pivot pin 121 so that the arm 123 moves toward the cam 132 shifts the position of the pivot pin 127. Because the stop 128 prevents movement of the finger 126 toward the cam 132 when the lever 120 pivots counterclockwise while not extending sufficiently from the support block 14 to prevent movement of the arm 123, the finger 126 pivots clockwise about the axis of the pivot pin 127 against the force of the spring 129 whereby the shoulder 133 of the finger 126 is removed from engagement with the cooperating cam profile 130 of the cam 132. When this occurs, the driving relation between the shaft 16 and the cam 132 causes clockwise rotation of the cam 132 with the shaft 16 since the lobe 131 is no longer engaging the shoulder 133 of the finger 126. This is a small amount of rotation because of the relatively short distance between the shoulders 133 and 134.

When the shoulder 134 of the arm 123 engages the lobe 131 on the cooperating cam profile 130 of the cam 132, clockwise rotation of the cam 132 by the shaft 16 is again stopped. However, this small amount of clockwise rotation of the cam 132 results in the finger 126 not being able to return into cooperation with the lobe 131 on the cam profile 130 of the cam 132 when the arm 49 of the lever 43 is returned to the position of FIG. 7; this occurs when the thickened portion of the strip 40 of material ceases to be disposed between the rollers 17 and 41.

When the arm 49 of the lever 43 is returned to the position of FIG. 7, the lever 120 is pivoted clockwise about the axis of the pivot pin 121 to move the shoulder 134 on the arm 123 out of engagement with the lobe 131 on the cooperating cam profile 130 of the cam 132. Since the shoulder 133 on the finger 126 cannot return into engagement with the lobe 131 on the cooperating cam profile 130 of the cam 132 because of the slight clockwise rotation of the cam 132 when the shoulder 133 on the finger 126 was removed from engagement with the lobe 131 on the cooperating cam profile 130 of the cam 132, the cam 132 is no longer held by either the shoulder 133 on the finger 126 or the shoulder 134 on the arm 123 whereby the cam 132 rotates clockwise with the shaft 16.

When the shaft 16 has rotated the cam 132 a sufficient distance to advance the thickened portion of the strip 40 of material just beyond the position in which the movable cutting blade 68 cooperates with the stationary cutting blade 69 to cut the strip 40 of material so that all of the thickened portion is removed, a link 152, which cooperates with a cam profile 153 (see FIG. 8) of the cam 132 due to the extension spring 125 that extends between the link 152 and the end of the arm 123, is moved downwardly because of a lobe 154 on the cam profile 153 engaging the upper end of the link 152 as the cam 132 rotates clockwise with the shaft 16.

The lower end of the link 152 is connected by a pin 155 to a finger 156, which is disposed above the push button 113 of the valve housing 112 and is pivotally or hingedly mounted on the pin 116 in the same manner as the finger 115. The force of the spring acting on the button 113 is sufficient to prevent the finger 156 from moving the button 113 inwardly unless the link 152 is moved downwardly by the cam 132.

When the finger 156 is moved downwardly by the link 152, the resiliently biased button 113 is moved inwardly to close the valve in the valve housing 112 whereby communication between the hoses 59 and 27 is stopped. This prevents further downward movement of the rack 23 whereby feeding of the strip 40 of the material is stopped. This stopping of the downward movement of the rack 23 can occur with the rack 23 in any position, and it does not depend upon the piston of the piston rod 117 abutting against the spacer in the air cylinder 110.

The pin 155 extends from the finger 156 over the finger 115. Accordingly, when the finger 156 is pivoted counterclockwise about the hinge or pivot pin 116 by the downward movement of the link 152, the pin 155 causes the finger 115 to also pivot counterclockwise about the pin 116. As a result, the button 57 also is moved inwardly to open the valve in the valve housing 55 and allow communication between the hoses 59 and 60 whereby pressurized air can be supplied to the air cylinder 61 to cause the cutting blade 68 to be advanced to cut the strip 40 of material in cooperation with the stationary cutting blade 69.

Accordingly, the downward movement of the rack 23 is stopped after the thickened portion of the strip 40 of material has passed between the rollers 17 and 41 and been advanced to a position in which all of the thickened portion of the strip 40 of material can be cut by the cutting blade 68. This insures that all of the thickened portion of the strip 40 of material is cut.

Upon completion of advancement of the cutting blade 68, the valve in the valve housing 84 is activated by a finger 157, which is similar to the finger 80 but is longer and is secured to the connecting means 67 in the same manner as the finger 80 of the apparatus of FIGS. 1 to 5, to cause the position of the valve spool in the valve housing 62 to be shifted. This results in pressurized air being supplied through the hose 88 to the air cyclinder 61 to retract the cutting blade 68.

The finger 157 also cooperates with a link 158, which is supported by a guide 159 fixed to the valve housing 84. The link 158 is connected to the link 152 by a pin 160, which also connects one end of the spring 125 to the link 152. Thus, when the link 158 is moved by the finger 157 at the completion of the advancement of the cutting blade 68, the link 152 is shifted so that it is moved out of the cooperating cam profile 153 of the cam 132 by moving the link 152 against the force of the spring 125.

When the link 152 is shifted by the link 158 due to the cutting blade 68 completing its advancement, the removal of the link 152 from engagement with the lobe 154 on the cooperating cam profile 153 of the cam 132 results in the link 152 being moved upwardly slightly because of the force of the spring acting through the button 113 on the finger 156. This positions the link 152 so that it cannot engage the lobe 154 on the cooperating cam profile 153 of the cam 132 when the cutting blade 68 is retracted. Then, when the link 158 ceases to hold the link 152 out of contact with the cooperating cam profile 153 because the finger 157 no longer engages the link 158 whereby the spring 125 becomes effective to return the link 152 into engagement with the cooperating cam profile 153 of the cam 132, the upper end of the link 152 moves to a position in which it cannot be disposed to engage the lobe 154 on the cooperating cam profile 153 of the cam 132 because of the prior upward movement of the link 152.

When the button 113 of the valve housing 112 moves outwardly to cause the upward movement of the link 152 because of the shifting by the link 158, the valve in the valve housing 112 again permits communication between the hoses 27 and 59. As a result, the upper end of the air cylinder 110 is vented since the hose 59 is now exhausted to the atmosphere because of the shift in the position of the valve spool in the valve housing 62 due to the supply of pressurized air to the valve housing 62 through the hose 87.

At the same time, the button 57 of the valve housing 55 also moves outwardly from the valve housing 55 so that communication between the hoses 59 and 60 is blocked. However, the valve in the valve housing 55 now vents the hose 60 to the atmosphere through the inlet in the bottom of the valve housing 55.

Accordingly, when the cutting blade 68 completes its advancement, pressurized air is supplied to the air cylinder 61 through the hose 88 to retract the cutting blade 68, and the other end of the air cylinder 61 is vented through the hose 60 because of the changing of the position of the button 57 of the valve housing 55 due to the upward movement of the link 152. At the same time, the spring in the air cylinder 110 rapidly moves the rack 23 upwardly because of the venting of the upper end of the air cylinder 110 through the hoses 27 and 59.

Then, it is only necessary for the operator to actuate the switch to supply another pulse of pressurized air through the hose 91 to the port 90 of the valve housing 62 to again shift the position of the valve spool in the valve housing 62 so as to supply pressurized air through the hose 59 and vent the hose 88. Then, the normal cutting cycle occurs as previously described for the apparatus of FIGS. 1 to 5.

The upper end of the link 152 is vertically guided in a groove 161 (see FIG. 7) formed in the cylindrical shaped member 102 on the stud 101. Thus, the link 152 is caused to move in a substantially vertical direction because of the disposition of the link 152 in the groove 161 and the connection of the link 152 by the pin 155 to the finger 156.

As previously mentioned, the arm 122 of the lever 120 has an adjusting screw 124 mounted thereon. The position of the adjusting screw 124 determines when the shoulder 133 of the finger 126 is withdrawn from engagement with the lobe 131 on the cooperating cam profile 130 of the cam 132.

Accordingly, the adjusting screw 124 must be set to insure that the removal of the shoulder 133 from engagement with the lobe 131 occurs at the desired time. Thus, the adjusting screw 124 has a lock nut cooperating therewith to retain the adjusting screw 124 in the desired position.

To obtain the desired position of the adjusting screw 124 in accordance with the thickness of the strip 40 of material being cut, the pivot pin 121 has a pointer 163 (see FIG. 9) attached thereto for cooperation with a mark 164 on the support or frame 12. To set the adjusting screw 124, the strip 40 of material is fed between the rollers 17 and 41. If the pointer 163 is not aligned with the mark 164, the lock nut 162 is turned to release the adjusting screw 124. Then, by holding the lock nut 162 and turning the adjusting screw 124, the lever 120 pivots until the pointer 163 aligns with the mark 164. When this occurs, the lock nut 162 is again tightened.

This arrangement insures that compensation occurs for different thicknesses of the strips 40 of material. This arrangement prevents the shoulder 133 on the finger 126 from being prematurely withdrawn from engagement with the lobe 131 on the cooperating cam profile 130 of the cam 132 because of the strip 40 of material being thicker than the strip 40 of material for which the adjusting screw 124 has previously been set.

Considering the operation of the modification of FIGS. 6 to 10, the strip 40 of material is initially fed through the rollers 17 and 41 in the same manner as described for the apparatus of FIGS. 1 to 5. The operator activates the switch to cause a pulse of pressurized air to be supplied to the port 90 of the valve housing 62 to cause a complete cutting cycle to occur whereby a selected length of the strip 40 of material is cut in the same manner as described for the apparatus of FIGS. 1 to 5.

When the thickened portion of the strip 40 initially enters between the rollers 17 and 41, the roller 41 is pushed away from the roller 17 whereby the arm 49 of the lever 43 pivots counterclockwise. This results in the lever 120 pivoting counterclockwise about the axis of the pin 121 to cause the arm 123 of the lever 120 to engage the cooperating cam profile 130 of the cam 132 and the finger 126 to be withdrawn from engagement with the lobe 131 on the cooperating cam profile 130 of the cam 132. This allows the cam 132 to rotate a slight amount clockwise until the shoulder 134 on the arm 123 engages the lobe 131 on the cooperating cam profile 130 of the cam 132 to stop rotation of the cam 132 with the shaft 16.

When the thickened portion of the strip 40 of material is no longer between the rollers 17 and 41 due to an advance therefrom by downward movement of the rack 23, the spring 47 urges the lever 43 clockwise so that the lever 120 pivots clockwise about the axis of the pin 121. The clockwise pivoting of the lever 120 removes the shoulder 134 on the finger 123 from engagement with the lobe 131 on the cooperating cam profile 130 of the cam 132 so that the cam 132 is no longer held against clockwise rotation.

Then, the cam 132 rotates clockwise with the shaft 16 for a distance corresponding to that required to advance the thickened portion of the strip 40 of material from the position in which it ceases to be disposed between the rollers 17 and 41 until it is positioned so that all the thickened portion can be cut by the cutting blade 68. When this amount of clockwise rotation of the cam 132 has occurred, the upper end of the link 152 is engaged by the lobe 154 on the cooperating cam profile 153 of the cam 132 to be moved downwardly to move the finger 156 downwardly.

When the lobe 154 on the cooperating cam profile 153 of the cam 132 engages the upper end of the link 152 to cause downward movement of the link 152, the valves in the valve housings 55 and 112 have their positions shifted. Accordingly, communication between the hoses 59 and 27 is blocked by the valve in the valve housing 112 but communication is permitted between the hoses 59 and 60 by the valve in the valve housing 55. This stops downward movement of the rack 23 to stop feeding of the strip 40 of material and causes advancement of the cutting blade 68 to cut the strip 40 of material.

When the cutting blade 68 completes its advancement, the finger 157 not only causes the valve in the valve housing 84 to have its position shifted whereby the valve spool in the valve housing 62 has its position changed but also removes the link 152 from engagement with the lobe 154 on the cooperating cam profile 153 of the cam 132. Accordingly, pressurized air is supplied through the hose 88 to the air cylinder 61 to retract the cutting blade 68 and the upper end of the air cylinder 110 is vented through the hoses 27 and 59 whereby the spring in the air cylinder 110 returns the rack 23 to its uppermost position as determined by the engagement of the stop 92 with the L-shaped block 93.

When the next cutting of the selected length of the strip 40 of material is to occur by the loop tack operator actuating the switch to supply a pulse of pressurized air to the port 90 of the switch housing 62, the cam 132 rotates with the shaft 16. This rotation of the cam 132 continues for more than one cutting cycle until the shoulder 133 on the finger 126 engages the cooperating lobe 131 on the cam profile 130 of the cam 132 to stop clockwise rotation of the cam 132 with the shaft 16. Thus, completion of the revolution of the cam 132 does not occur until after more than one cutting cycle.

Of course, the cam profile 130 of the cam 132 could have two of the lobes 131 and the cam profile 153 of the cam 132 could have two of the lobes 154. With this arrangement, the cam 132 would not have to rotate through 360° before the shoulder 133 on the finger 126 would again engage one of the lobes 131 on the cam profile 130 of the cam 132 to stop clockwise rotation of the cam 132 with the shaft 16. Thus, rotation of the cam 132 would not occur after one cutting cycle.

While the cam 132 has been shown and described as having the two cam profiles with each having its own separate lobe, it should be understood that the cam 132 could have a single profile if desired. With the single profile, the cam 132 would have three equally angularly spaced lobes with each of the lobes being adapted to engage the shoulders on the arm 123 and the finger 126 and the upper end of the link 154. This would result in the cam 132 rotating slightly less than 60° after the lobe is not engaging the upper end of the link 154 before the rotation of the cam 132 is stopped by the shoulder 133 on the finger 126.

Upon retraction of the cutting blade 68 and return of the rack 23 to its uppermost position, the apparatus of the present invention is now ready for another cutting cycle of the selected length of the strip 40 of material. This is begun by the operator actuating the switch to supply a pulse of pressurized air to the port 90 of the switch housing 62.

The apparatus of FIGS. 6 to 10 also may be employed to automatically cut a strip of material in which the strip of material has the adjacent ends of the strips spaced from each other with threads connecting these spaced adjacent ends to each other to form the continuous strip of material. The apparatus of FIGS. 6 to 10 requires certain minor changes to enable the automatic cutting of the strip of material after the thin portion, which is produced by the threads sewing the adjacent spaced ends of two strips from two pieces or lays of material to each other, has been advanced by the knurled roller 17 just beyond the position at which the cutting blade 68 cuts the strip of material.

Figure 11:
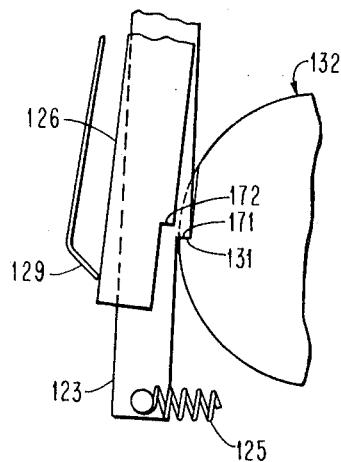
FIG. 11 is a fragmentary elevational view showing the cooperation of a finger and an arm with the cam in a modification of the apparatus of FIGS. 6 to 10.

Referring to FIG. 11 of the drawings, the lobe 131 of the cam 132 is shown engaging a shoulder 171 on the arm 123 of the lever 120. Furthermore, the finger 126 has a shoulder 172 thereon that is spaced above the shoulder 171. The arm 123 no longer has the shoulder 134, and the finger 126 no longer has the shoulder 133.

Thus, when the thin portion of the strip of material passes between the rollers 17 and 41, the lever 43 pivots clockwise to cause the lever 120 to pivot clockwise about the axis of the pin 121. This results in the shoulder 171 of the arm 123 being withdrawn from engagement with the lobe 131 and the finger 126 being urged by the spring 129 into the position in which the shoulder 172 of the finger 126 can engage the lobe 131 on the cam profile 130 of the cam 132 when the cam 132 rotates slightly clockwise due to the shoulder 171 being withdrawn from engagement with the lobe 131. Thus, the initial clockwise rotation of the cam 132 is due to the thin portion of the strip of material entering between the rollers 17 and 41 to enable the roller 41 to move closer to the roller 17.

Due to the absence of any material except for the threads between the adjacent connected ends of two strips formed from two lays or pieces of material, the rollers 17 and 41 must engage in this embodiment. Thus, it is necessary to coat the knurled roller 17 and the roller 41 with a suitable protective material such as rubber, for example.

When the threaded portion of the strip of material ceases to pass between the rollers 17 and 41, the normal portion of the strip of material causes the lever 43 to pivot counterclockwise whereby the lever 120 pivots counterclockwise about the axis of the pin 121. When this occurs, the shoulder 172 of the finger 126 is withdrawn from engagement with the lobe 131 on the cam profile 130 of the cam 132 whereby the cam 132 now rotates with the shaft 16 until the lobe 154 is engaged by the upper end of the link 152 in the manner previously described. The remainder of the operation is the same as that described for the apparatus of FIGS. 6 to 10. Thus, the only difference is that a thin portion, which is less than a predetermined thickness of the strip of material, is sensed as to when it initially passes between the rollers 17 and 41 and when the thin portion of the strip of material ceases to pass between the rollers 17 and 41.

While the air cylinder 110 has been shown and described as utilizing the spring in the air cylinder 110 to move the rack 23 upwardly, it should be understood that the air cylinder 25 could be employed instead of the air cylinder 110 with the apparatus of FIGS. 6 to 10. Then, there would be the same type of connection from the valve housing 62 through the hose 28 to the lower end of the air cylinder 25. Similarly, in the apparatus of FIGS. 1 to 5, the air cylinder 110 with the spring could be employed rather than the air cylinder 25 if desired.

While the present invention has shown and described the knurled roller 17 and the roller 41 as being spaced from each other except when the strip of material having adjacent strips joined by threads is employed, it should be understood that the rollers 17 and 41 could engage each other at all times if desired. Of course, this would require the rollers 17 and 41 to be coated in the same manner as described when the rollers 17 and 41 are utilized with the strip of material having adjacent strips joined by threads.

While the apparatus of the present invention has been described as requiring the operator to actuate a switch to start another cutting cycle, it should be understood that the apparatus of the present invention could be continuously operated if desired. This would require other sensing means to sense when the cutting blade 68 has completed its retraction and the rack 23 has returned to its uppermost position. For example, a switch could be mounted to be activated by the finger 80 or 157 when the cutting blade 68 has completed its retraction.

If desired, the cut segments could be automatically diverted to different areas depending on whether the cut segment is one that may be used as the belt loop. Thus, a selection mechanism for the cut segments could be employed in a manner similar to that shown cut described in the copending patent application of Volker Schmidt et al for "Material Cutting Apparatus Having A Selector," Ser. No. 122,415 and filed Mar. 9, 1971, now U.S. Pat. No. 3,701,300.

It should be understood that the end of the cutting blade 68 has a slight projection or extension in the same manner as described in the aforesaid Schmidt et al application. There also is a similar undercutting of the bottom surface of the guide 73 in the same manner as described in the aforesaid Schmidt et al application. This produces the desired scissor action during cutting.

An advantage of this invention is that the belt loops are automatically the same shade and color as the pants to which they are to be sewn. Another advantage of this invention is that various lengths of belt loops may be easily cut. A further advantage of this invention is that it reduces waste of material due to the thickened portion at which two strips from two lays or pieces of material are sewed together. Still another advantage of this invention is that it eliminates any overtravel so that each cut segment is the same length. A still further advantage of this invention is that there is no hang up of any material to block the feed of the material.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

We claim:

1. An apparatus for cutting strips of material including:
    means to feed the material, said feed means including means movable from a first position to feed the material;
    means to inactivate said feed means to stop feeding of the material in response to a selected length of the material being fed by said feed means past a cutting position;
    means to cut the fed material at the cutting position;
    means responsive to said feed means to activate said cutting means to cut the fed material substantially simultaneously with stopping of said feed means;
    and means responsive to said cutting means completing cutting of the fed material to cause simultaneous return of said cutting means to its inactive position and said movable means of said feed means to the first position in which feeding of the material by said feed means may again occur.

2. The apparatus according to claim 1 in which: said feed means includes:
    two cooperating rollers between which the material is fed;
    and means to rotate one of said rollers in only one direction to feed the material between said rollers, said rotating means including said movable means of said feed means.

3. The apparatus according to claim 2 in which said rotating means includes:
    a gear;
    means connecting said gear to said rotated roller, said connecting means including means to allow rotation of said rotated roller by said gear only in the one direction;
    and means to drive said gear, said drive means including said movable means.

4. The apparatus according to claim 3 in which: said drive means includes:
    a rack meshing with said gear;
    and means to axially move said rack in opposite directions.

5. The apparatus according to claim 4 including means cooperating with said rack to limit the movement of said rack in the direction in which said rotated roller is not rotated to determine the selected length of material fed by said feed means.

6. The apparatus according to claim 2 including means to mount said roller that is not rotated by said rotating means for movement relative to said rotated roller to receive the material therebetween.

7. The apparatus according to claim 3 including braking means to prevent rotation of said rotated roller beyond that imparted by rotation of said gear by said drive means.

8. An apparatus for cutting strips of material including:
    means to feed the material;
    first means to inactivate said feed means to stop feeding of the material in response to a selected length of the material being fed by said feed means past a cutting position;
    means to cut the fed material at the cutting position;
    means responsive to said feed means to activate said cutting means to cut the fed material substantially simultaneously with stopping of said feed means;
    means responsive to said cutting means completing cutting of the fed material to cause return of said cutting means to its inactive position;
    means to sense when the thickness of the material being fed by said feed means exceeds a predetermined thickness and when the thickness of the material being fed by said feed means ceases to exceed the predetermined thickness after having exceeded the predetermined thickness;
    second means to inactivate said feed means after said sensing means has sensed that the thickness of the material has ceased to exceed the predetermined thickness after having exceeded the predetermined thickness irrespective of whether said feed means has fed the selected length of material;
    and said second inactivating means including means to cause activation of said cutting means substantially simultaneously with inactivation of said feed means.

9. The apparatus according to claim 8 in which:
    said feed means includes two cooperating rollers between which the material is fed;
    means to rotate one of said rollers in only one direction to feed the material between said rollers;
    means to mount the other of said rollers for movement relative to said one roller;
    and said sensing means includes means responsive to a movement of a predetermined amount of said other roller in a first direction away from said one roller due to the thickness of the material exceeding the predetermined thickness and a movement of a predetermined amount of said other roller in a second direction toward said one roller due to the thickness of the material ceasing to exceed the predetermined thickness after having exceeded the predetermined thickness.

10. The apparatus according to claim 9 in which said sensing means includes:

cam means movable a predetermined distance by said feed means after said other roller moves a predetermined distance in the second direction;

and means responsive to said cam means moving the predetermined distance to render said second inactivating means effective.

11. An apparatus for cutting strips of material including:

means to feed the material;

first means to inactivate said feed means to stop feeding of the material in response to a selected length of the material being fed by said feed means past a cutting position;

means to cut the fed material at the cutting position;

means responsive to said feed means to activate said cutting means to cut the fed material substantially simultaneously with stopping of said feed means;

means responsive to said cutting means completing cutting of the fed material to cause return of said cutting means to its inactive position;

means to sense when the thickness of the material being fed by said feed means is less than a predetermined thickness and when the thickness of the material being fed by said feed means ceases to be less than the predetermined thickness after having been less than the predetermined thickness;

second means to inactivate said feed means after said sensing means has sensed that the thickness of the material has ceased to be less than the predetermined thickness after having been less than the predetermined thickness irrespective of whether said feed means has fed the selected length of material;

and said second inactivating means including means to cause activation of said cutting means substantially simultaneously with inactivation of said feed means.

12. The apparatus according to claim 11 in which:

said feed means includes two cooperating rollers between which the material is fed;

means to rotate one of said rollers in only one direction to feed the material between said rollers means to mount the other of said rollers for movement relative to said one roller;

and said sensing means includes means responsive to a movement of a predetermined amount of said other roller in a first direction toward said one roller due to the thickness of the material being less than the predetermined thickness and a movement of a predetermined amount of said other roller in a second direction away from said one roller due to the thickness of the material ceasing to be less than the predetermined thickness after having been less than the predetermined thickness.

13. The apparatus according to claim 12 in which said sensing means includes:

cam means movable a predetermined distance by said feed means after said other roller moves a predetermined distance in the second direction;

and means responsive to said cam means moving the predetermined distance to render said second inactivating means effective.

14. The apparatus according to claim 1 including means cooperating with said feed means to determine the selected length of material fed by said feed means before said feed means is stopped.

15. The apparatus according to claim 1 in which said activating means comprises means engaged by said feed means at the completion of feeding of the selected length of material to activate said cutting means.

* * * * *

UNITED STATES PATENT OFFICE
CERTIFICATE OF CORRECTION

Patent No. 3,735,657    Dated May 29, 1973

Inventor(s) VOLKER SCHMIDT, ET. AL.

It is certified that error appears in the above-identified patent and that said Letters Patent are hereby corrected as shown below:

Column 17, line 45, after "nut", insert -- 162 -- .

Column 21, line 6, "cut" should read -- and -- . Column 24, line 9, after "rollers", insert -- ; -- .

Signed and sealed this 22nd day of January 1974.

(SEAL)
Attest:

EDWARD M. FLETCHER, JR.    RENE D. TEGTMEYER
Attesting Officer    Acting Commissioner of Patents